(12) United States Patent
Fritzner et al.

(10) Patent No.: US 6,283,893 B1
(45) Date of Patent: Sep. 4, 2001

(54) TRANSMISSION

(75) Inventors: Anton Fritzner, Markdorf; Franz Bitzer, Landau, both of (DE)

(73) Assignee: LuK Getriebe-Systeme GmbH, BuhL/Baden (DE)

( * ) Notice: Subject to any disclaimer, the term of this patent is extended or adjusted under 35 U.S.C. 154(b) by 0 days.

(21) Appl. No.: 09/460,894

(22) Filed: Dec. 14, 1999

(30) Foreign Application Priority Data

Dec. 16, 1998 (DE) ............................................... 198 58 039

(51) Int. Cl.$^7$ .................................................. B60K 23/00
(52) U.S. Cl. ................. 477/176; 701/87; 474/11
(58) Field of Search .............................. 474/11; 477/176; 701/87

(56) References Cited

U.S. PATENT DOCUMENTS

| | | | | |
|---|---|---|---|---|
| 4,649,486 | * | 3/1987 | Oshiage | 364/424.1 |
| 5,052,980 | * | 10/1991 | Itoh et al. | 474/11 |
| 5,070,961 | * | 12/1991 | Tezuka | 180/249 |
| 5,182,968 | * | 2/1993 | Mott | 74/856 |
| 5,749,061 | * | 5/1998 | Kono et al. | 701/68 |
| 5,779,595 | * | 7/1998 | Kono et al. | 477/174 |
| 5,807,209 | * | 9/1998 | Matsubara et al. | 477/176 |
| 5,842,953 | * | 12/1998 | Yasue et al. | 477/174 |
| 5,871,411 | * | 2/1999 | Senger et al. | 474/11 |

\* cited by examiner

*Primary Examiner*—Dirk Wright
(74) *Attorney, Agent, or Firm*—Darby & Darby

(57) ABSTRACT

A method of controlling a friction-based torque-transmitting system in the drive train of a motor vehicle has the following steps:
a) monitoring the respective rates of rotation of an input element and an output element of the torque-transmitting system,
b) establishing and analyzing a correlation between said rates of rotation; and
c) initiating a change in the operating mode of the torque-transmitting system if the correlation is found to have changed in excess of a given threshold limit.

14 Claims, 10 Drawing Sheets

TRANSMISSION

BACKGROUND OF THE INVENTION

The invention relates to a method of controlling the operation of a friction-based torque-transmitting system such as, in particular, a transmission or a continuously variable transmission in the drive train of a motor vehicle.

Systems for transmitting torque in the drive train of a motor vehicle by means of a frictional engagement, e.g., clutches (including lock-up clutches in the torque converters of automatic transmissions), continuously variable transmissions operating with endless flexible torque-transmitting devices, friction-drive mechanisms, as well as brakes, are increasingly being automated, i.e., operated under the control of appropriate actuators. The control or regulation of the torque to be transmitted through frictional engagement by the respective torque-transmitting system in each given case should be performed with the smallest amount of contact force possible in order to minimize the load on the actuators, to keep energy consumption small, and to achieve a high level of control/regulation accuracy. However, the amount of contact force should be sufficient to avoid a condition of permanent slippage that would rapidly wear out or destroy the friction-based torque-transmitting system. To avoid the risk of wear-out or destruction, an excess amount of contact pressure is used in most cases between elements transmitting torque through frictional engagement. Generally, an excess amount of contact pressure is also employed for the purpose of preventing unintended slippage due to wear of individual parts, settling effects, temperature effects or viscosity-based parameter changes.

One possibility to recognize a slippage condition between elements transmitting torque through frictional engagement is known from DE 195 44 061 A1. To recognize the limit between adhesion and slippage, a pressure-operated actuator element that controls the compressive contact force between the two elements transmitting torque through frictional engagement is supplied with an actuating pressure that includes a superimposed modulated signal. The signal variation is correlated, e.g., to the rate of rotation of an output shaft of the transmission. The limit between adhesion and slippage is determined as the point where the level of correlation falls below or rises above a predetermined value. The process of adding a modulated signal to the actuating pressure requires additional control elements and is relatively expensive.

OBJECT OF THE INVENTION

The object of the present invention is to provide a method of the kind discussed above as well as an apparatus for performing the method whereby the operating state of a friction-based torque-transmitting system can be controlled simply and cost-effectively without the need to apply unnecessarily large amounts of actuating force to the parts of the system that are in frictional engagement but, on the other hand, with the assurance that the system will not be damaged by sudden fluctuations of the torque.

SUMMARY OF THE INVENTION

To meet this objective, the invention provides a method of controlling the operation of a system that transmits torque through a frictional engagement in the drive train of a motor vehicle. A currently preferred embodiment of the inventive method has the following steps:

a) Certain operating parameters of the drive train are continuously monitored, in particular the respective rates of rotation of an input element and an output element of the friction-based torque-transmitting system.

b) A correlation is established and analyzed between the respective rates of rotation of the input element and an output element.

c) A change is effected in the operating state of the system if the correlation is found to have crossed a given threshold value.

For example, in an advantageous embodiment of the invention, the torque-transmitting capacity of the system is increased when the correlation is found to have fallen below a predetermined value.

In a particular embodiment of the inventive concept, following a decrease in correlation, the transmission ratio of a continuously variable transmission is rapidly changed in such a way that a preset level of correlation is restored between the respective rates of rotation of the input element and the output element.

As a further solution, the object of the invention is met by the following method of controlling a friction-based torque-transmitting system in the drive train of a motor vehicle:

a) Certain operating parameters that are predictors of an imminent peak torque load are continuously monitored.

b) A change is initiated in the operating state of the system if the monitored operating parameters are found to predict an imminent peak torque load.

By registering and recognizing imminent peak torque loads at the onset, it is possible to control friction-based torque-transmitting systems so that operating conditions that could cause damage to the systems themselves or to other components are avoided or that even in case of a peak torque load, the state of adhesive friction between the frictionally engaged components of the system does not change to sliding friction.

In an advantageous application of the immediately preceding concept, a change of the rate of rotation of at least one driven wheel of the motor vehicle is measured and if it is found to exceed a predetermined value, a change is initiated in the operating state of the friction-based torque-transmitting system.

Instead of measuring the rate of rotation of at least one driven wheel, it is also possible to measure the difference between the respective rates of rotation of the at least one driven wheel and a further wheel of the motor vehicle and to initiate a change in the operating state of the friction-based torque-transmitting system if the difference exceeds a given threshold value.

In another advantageous embodiment of the inventive method, a change in the operating state of the torque-transmitting system is initiated upon activation of stabilizing systems that are provided for the purpose of stabilizing a driving behavior of the motor vehicle. In a variation of the same concept, certain threshold values occurring in algorithms used to activate the stabilizing systems are lowered, and the change in the operating state of the friction-based torque-transmitting system is initiated when the lowered threshold values are exceeded.

The generically named torque-transmitting system in any of the aforementioned embodiments of the inventive method can be a friction clutch. In this case, the change in the operating state comprises an increase or decrease of the torque-transmitting capacity of the friction clutch.

Further, in any of the aforementioned embodiments of the inventive method., the torque-transmitting system can be a continuously variable transmission, in which case the change in the operating state can comprise an increase or decrease of the torque-transmitting capacity of the continuously variable transmission.

Likewise, in the immediately preceding case where the torque-transmitting system is a continuously variable transmission, the change in the operating state could also comprise an increase or decrease of the transmission ratio of the continuously variable transmission.

Sudden changes in magnitude of the engine torque can cause a motor vehicle to jolt or shake and thereby cause discomfort to the occupants of the vehicle. Aimed in particular at preventing this undesirable jolting or shaking of the vehicle is an embodiment of the inventive method wherein at least one control parameter governing engine torque is monitored and, after a change of the control parameter has been found, a change of the transmission ratio of a continuously variable transmission is initiated. As an example of this concept, it can be advantageous to change the continuously variable transmission towards an underdrive condition when the torque is increased.

Finally, the scope of the present invention also covers any kind of apparatus functioning in accordance with any of the embodiments of the method described above.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The invention is explained below with details referenced against the attached drawing, where.

DETAILED DESCRIPTION OF THE INVENTION

Figure 1:
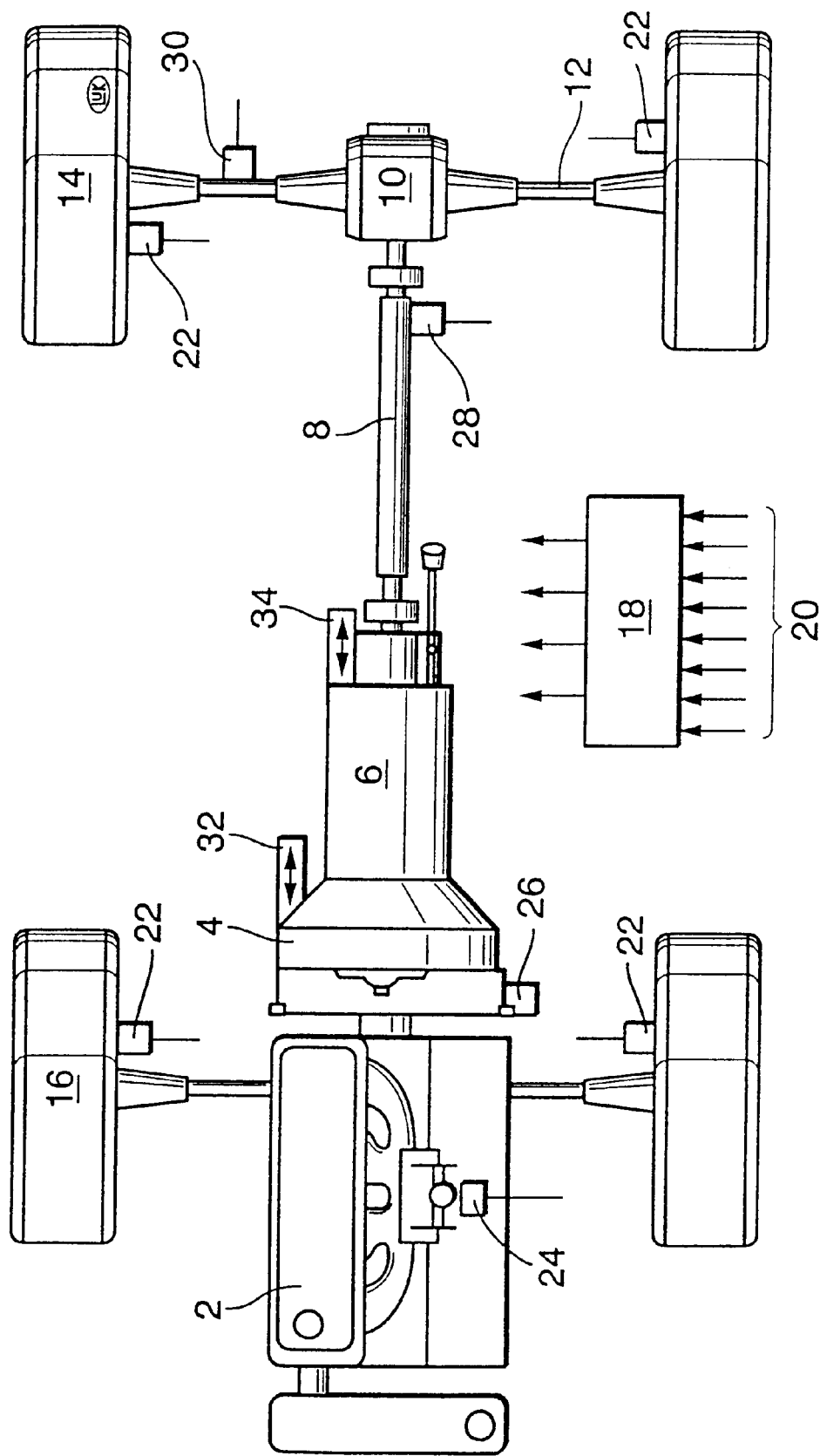
FIG. 1 represents a schematic view of a motor vehicle with a drive train.

According to FIG. 1, a motor vehicle has an engine 2 which, by way of a clutch 4 and a transmission 6, is connected to a drive shaft 8. Through a differential 10, the drive shaft 8 transmits power to the driving axles 12 which have a rotationally fixed connection to the rear wheels 14. In the illustrated example, the front wheels 16 are not driven. However, in a different embodiment, the front wheels, or all of the wheels of the vehicle, can be driven.

An electronic control unit 18 equipped in an essentially known manner with a microprocessor and associated memory devices has inputs 20 connected to sensors. The sensors include, e.g., wheel-rpm sensors 22, a throttle valve sensor 24, an engine-rpm sensor 26, a drive shaft-rpm sensor 28, a torque sensor 30 for sensing the torque transmitted through the respective driving axle 12, and in some cases additional or different sensors.

Outputs of the electronic control unit 18 are connected to a clutch actuator 32 and a transmission actuator 34 as well as in some cases additional actuators of the drive train such as, e.g., a throttle valve actuator.

The transmission 6 of the illustrated example is a continuously variable transmission with an actuator 34 that is hydraulically controlled.

Figure 2:
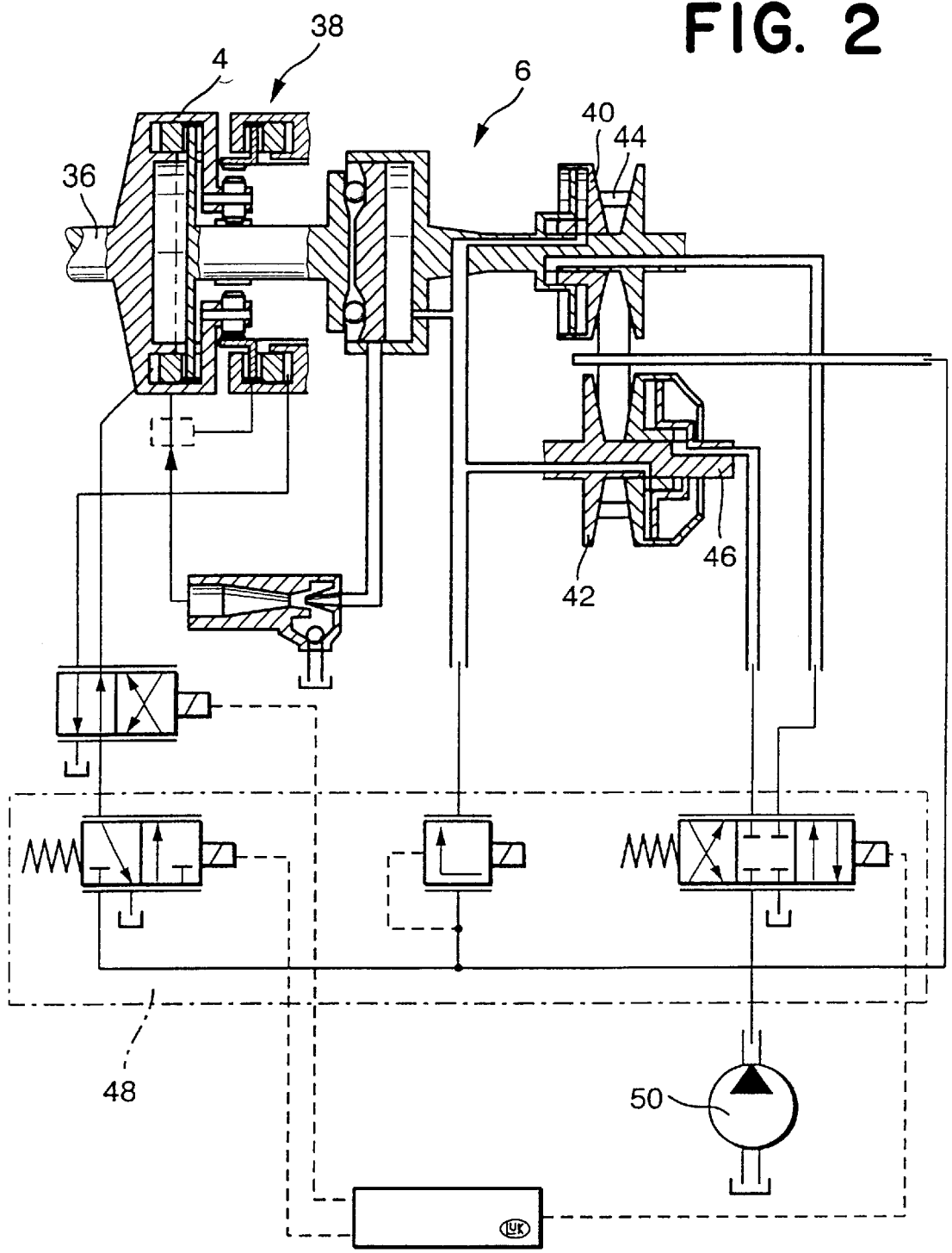
FIG. 2 represents a sectional view of a continuously variable transmission with a clutch at the input side and with a drive output.

FIG. 2 represents a schematic view of important components of the clutch and the transmission of FIG. 1. A prime mover shaft 36 with a rotationally fixed connection to the crank shaft of the engine drives—by way of a clutch 4 and a reverse-gear set 38—the first pair of conical disks 40 of a continuously variable transmission 6. The first pair of conical disks 40 is connected to a second pair of conical disks 42 through an endless flexible torque-transmitting device 44. The endless flexible torque-transmitting device 44 is frictionally engaged in each of the pairs of conical disks 40, 42. By way of a drive shaft 46, the second pair of conical disks 42 drives the differential which, in the example of FIG. 2, is arranged immediately adjacent to the transmission and drives the front wheels.

A hydraulic system 48, supplied with pressure from a pump 50, serves to control the clutch and the transmission.

The pressure pushing the conical disks against the endless flexible torque-transmitting device is generated hydraulically but could also be produced by other means, e.g., through an electric motor, a spring, a centrifugal force, etc. The essential aspect is that at least a part of the contact pressure is freely controllable through a control element. Two embodiments of hydraulic systems for controlling the contact pressure are illustrated in FIGS. 3 and 4, respectively.

Figure 3:
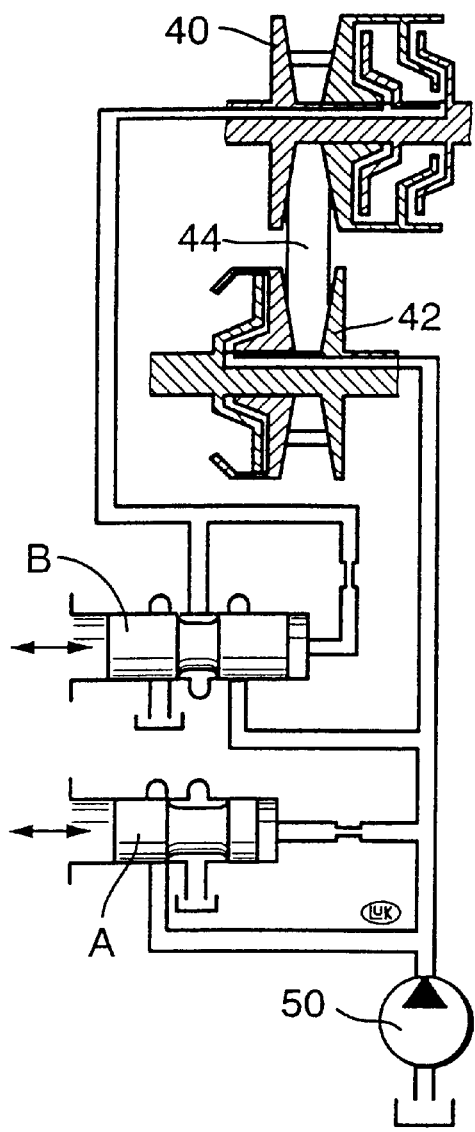
FIG. 3 represents a schematic view of a hydraulic system for controlling a continuously variable transmission.

According to FIG. 3, a valve A controls the pressure acting on the pair of conical disks 42. A valve B controls the pressure acting on the first pair of conical disks 40. In this arrangement, the valve A controls the contact pressure force, while valves A and B together are employed to effect changes of the transmission ratio. Valve A is freely controllable, e.g., by means of an electromagnetic control that is governed by appropriate logic circuits.

Figure 4:
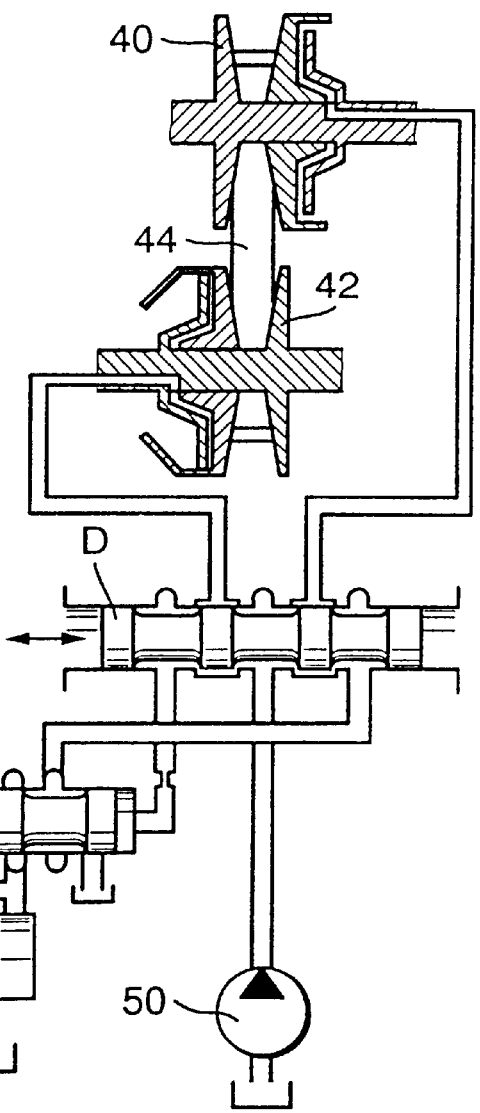
FIG. 4 represents a further schematic view of a hydraulic system for controlling a continuously variable transmission.

In the embodiment of FIG. 4, the contact pressure is controlled by a combination of a valve C with a hydraulic-mechanical torque sensor 52. The valve C is freely controllable; the torque sensor 52 provides a torque-dependent control of the pressure. With this arrangement, a part of the contact pressure is freely controllable and another part is subject to a torque-dependent control. To change the relative positions of the pairs of conical disks, a pressure differential between the pairs of conical disks 40 and 42 is produced by means of a valve D.

Measurement inputs for the control of the transmission are, e.g., the output signal of the throttle valve sensor 24 or other measurement and control parameters that are indicative of the magnitude of the torque supplied by the engine.

The components and arrangements described so far are known per se and will therefore not be discussed in closer detail with regard to their construction and function.

The contact pressure (controlled by valve A of FIG. 3, or valve C of FIG. 4, respectively) that the pairs of conical disks exert against the endless flexible torque-transmitting device needs to be large enough—but not unnecessarily large—so that slippage between the endless flexible torque-transmitting device 44 and the pairs of conical disks is avoided. Normally, a coarse control of the contact pressure is provided in accordance with a set of characteristics stored in the memory of the control system. In addition, the contact pressure can be fine-controlled or regulated in accordance with other operating parameters.

Figure 5:
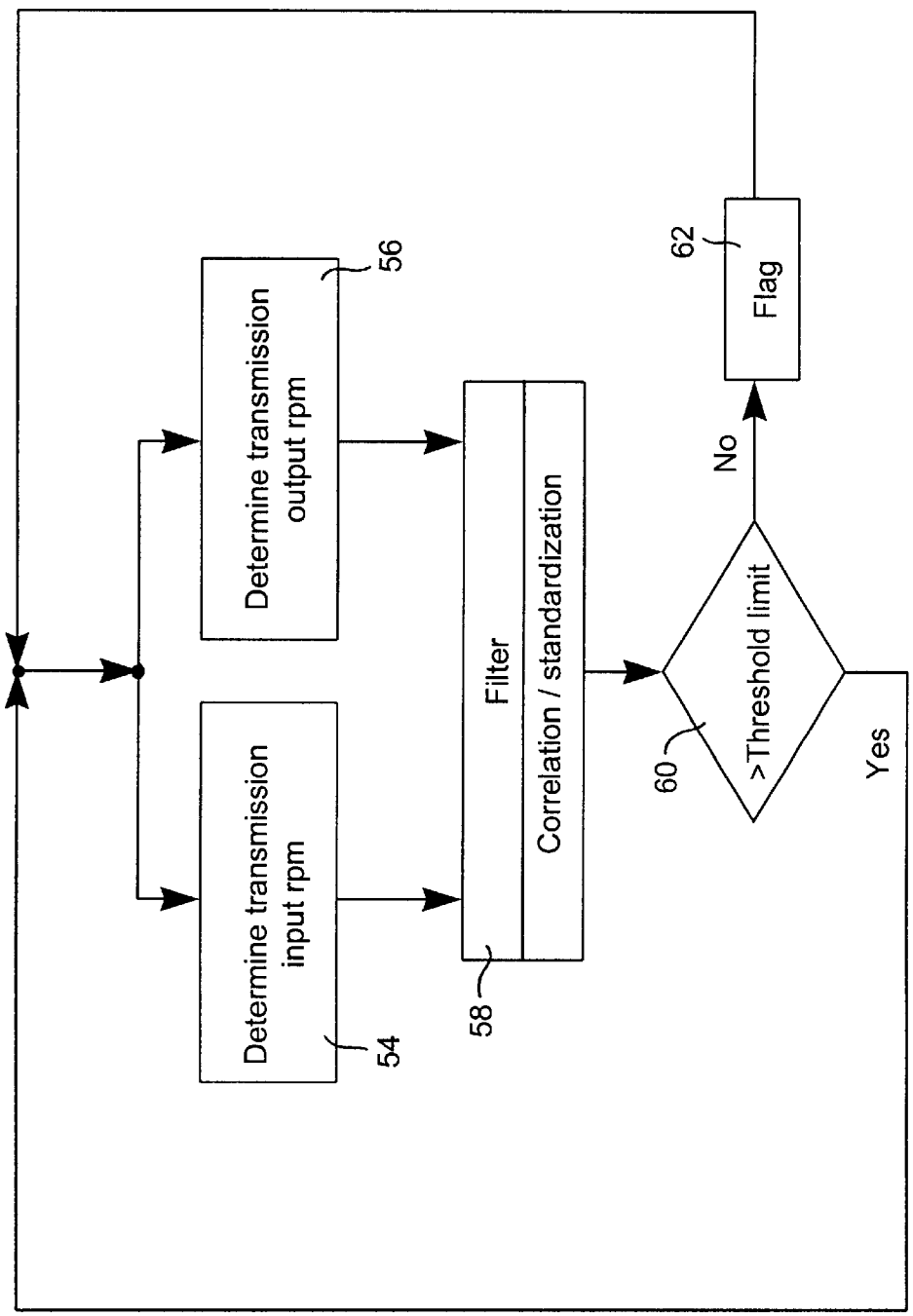
FIG. 5 represents a flow diagram of a control algorithm.

FIG. 5 illustrates a flow diagram of a logic program by which an additional control can be applied through appropriate practical means to the valve A of FIG. 3 or the valve C of FIG. 4. According to FIG. 5, block 54 represents the step of determining the rate of rotation of the prime mover shaft 36, i.e., of the transmission input, by means of an appropriate sensor, while block 56 represents the simultaneous step of determining the rate of rotation at the output of the transmission, e.g., by means of an appropriate sensor arranged immediately on the drive shaft 46. In block 58, the rates of rotation measured in blocks 54 and 56 are first processed through a filter that can be configured as a low-pass, band-pass, or high-pass filter and then subjected to a correlation analysis. Block 60 represents a test as to whether the correlation value (i.e., the result of a cyclically repeated calculation for a time window of given width) is higher than a given threshold value. If this is the case, then the measuring and computing loop begins anew. If the test is not met, a flag is set in step 62 which, in turn, triggers the onset of certain measures, e.g., an increase of the contact pressure, whereupon a new measuring and computing loop is performed.

Figure 6:
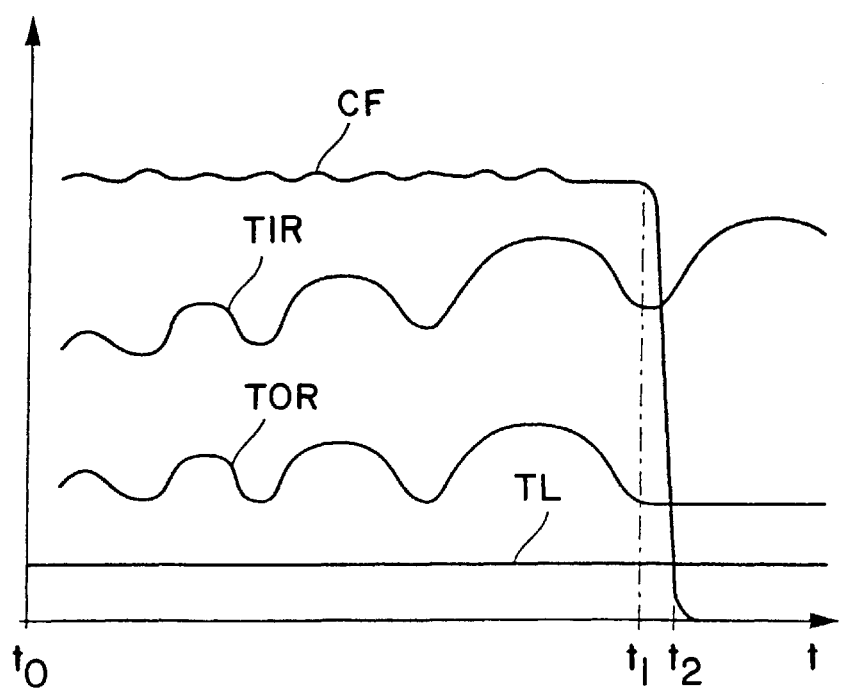
FIG. 6 represents signal curves belonging to the flow diagram of FIG. 5.

FIG. 6 shows a graph of the measuring signal values associated with the logic loop of FIG. 5. The curve TIR represents the transmission-input rate of rotation (e.g., in rpm), TOR represents the transmission output rate of rotation, and CF represents the correlation function. A loop begins at the time $t_o$. The two rpm signals are acquired and the correlation value is calculated. As long as the torque-transmitting capacity of the continuously variable transmission exceeds the magnitude of the actual torque to be transmitted, the rpm values of the transmission output remain coupled to the rpm values of the transmission input, a state that corresponds to a high value of the correlation function. If, on the other hand, the continuously variable transmission is slipping, the coupling between input and output becomes significantly weaker.

In FIG. 6, a slippage condition is setting in at the time $t_1$, when an oscillation of rpm rate of the transmission input caused, e.g., by an engine irregularity, either ceases to appear or appears only at a reduced intensity at the transmission output. The correlation function CF breaks down. At the time $t_2$, the correlation function CF crosses below a threshold limit TL, whereupon a flag is set to increase the contact pressure.

The example of FIGS. 5 and 6 illustrates how to determine whether the torque-transmitting capacity is sufficient by analyzing the correlation between respective rpm fluctuations at the input and output of a torque-transmitting system. The torque-transmitting system can be any kind of friction-based transmission, a clutch, or other device.

Figure 7:
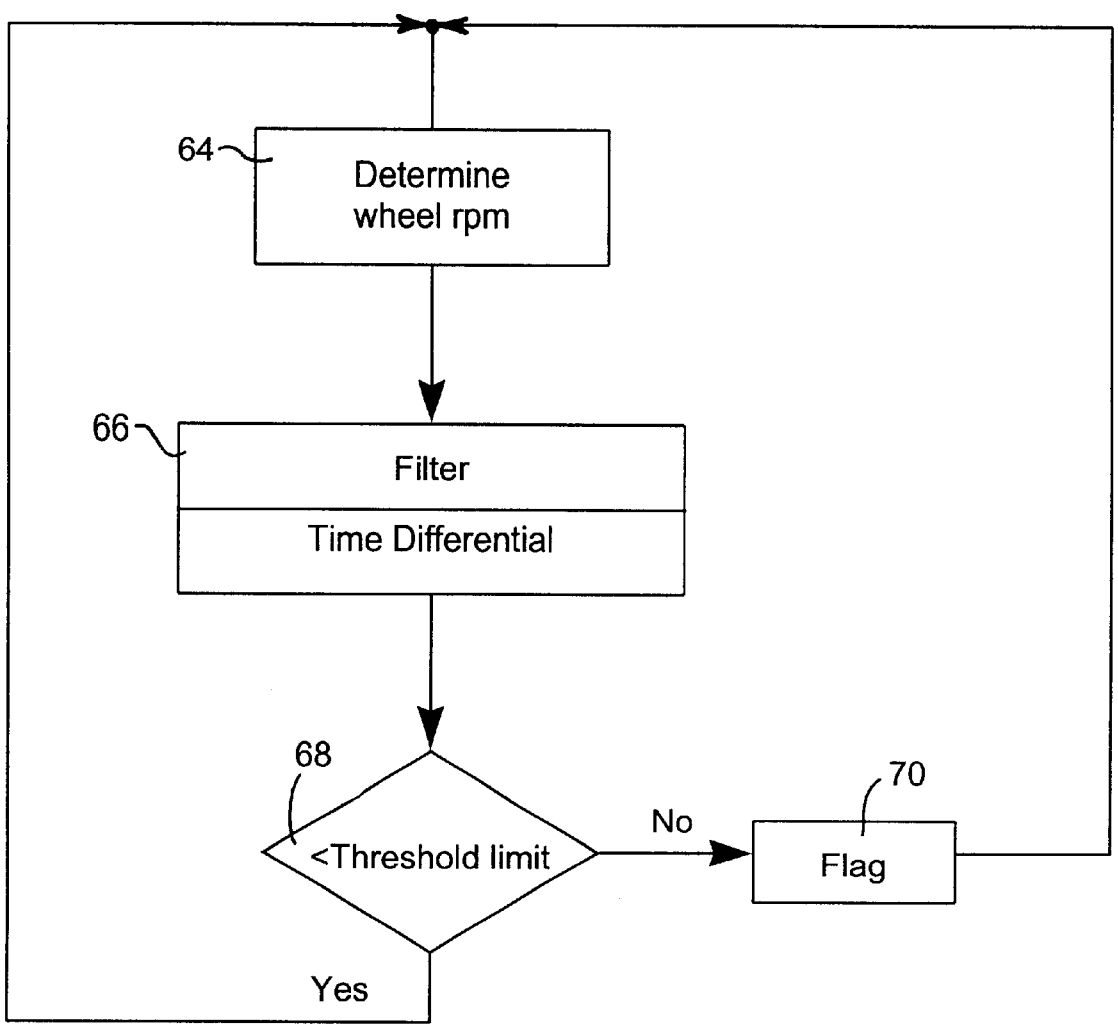
FIG. 7 represents a flow diagram of a further control algorithm.

FIG. 7 illustrates another example of a logic loop for recognizing a slippage condition. Block 64 represents the step of determining the rate of rotation of a driven wheel. It is also possible to use a combined value based on the rates of rotation of driven and/or non-driven wheels. In block 66, the rpm values acquired over a given time window are processed through a filter, and the time differential of the rpm curve is determined.

In block 68, the time differential, i.e., the level of acceleration or deceleration, is compared to a threshold limit. If the deceleration is below the threshold, a new cycle is performed. If the deceleration is above the threshold, a flag is set at step 70, and the cycle starts over.

Figure 8:
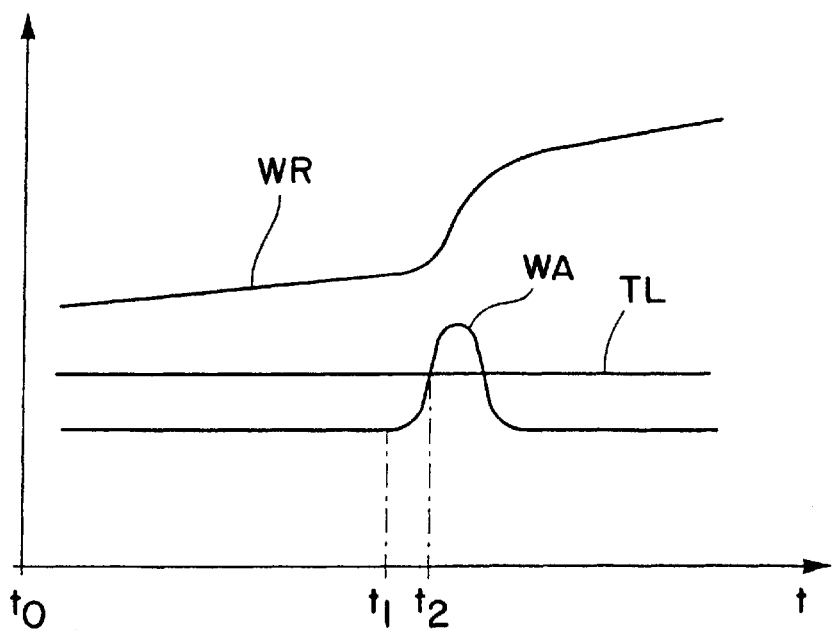
FIG. 8 represents signal curves belonging to the flow diagram of FIG. 7.

FIG. 8 shows a graph of the measuring signal values associated with the logic loop of FIG. 7. The curve WR represents the wheel rpm value measured in step 64. WA is the wheel acceleration determined in step 66. TL stands for threshold limit. The wheel acceleration WA starts to increase at the time $t_1$ and crosses above the given threshold limit TL at the time $t_2$. The threshold limit can depend on different parameters. When the threshold limit TL is exceeded, a flag is set at step 70 which, in turn, causes the contact pressure in the continuously variable transmission to be increased in order to prevent slippage of the endless flexible torque-transmitting device. A large amount of wheel acceleration can indicate that one or both of the driven wheels are slipping. At the transition from slippage to adhesion of a wheel, high levels of acceleration can occur in the drive train which, in turn, can cause the endless flexible torque-transmitting device to slip.

Figure 9:
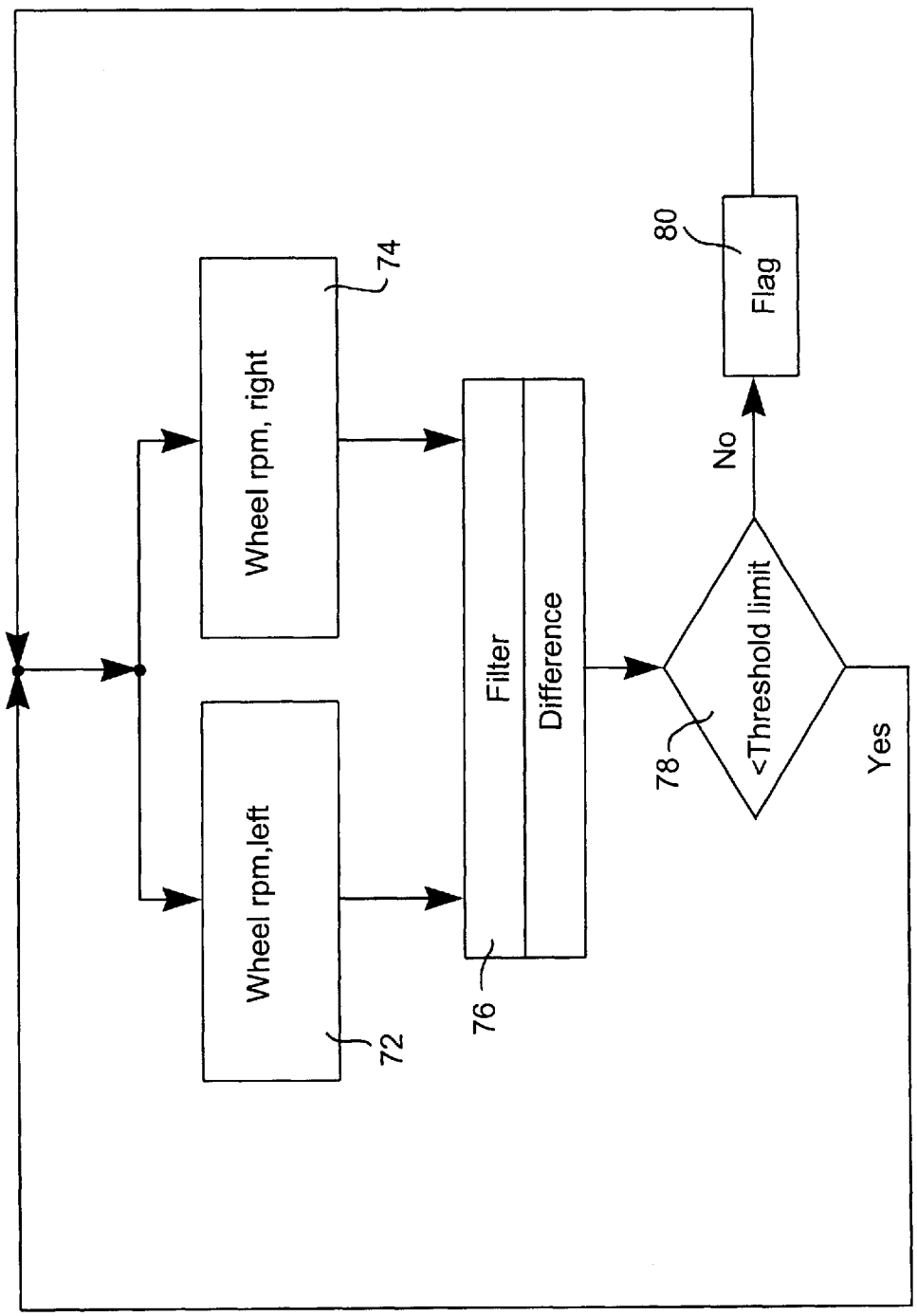
FIG. 9 represents a flow diagram of a further control algorithm.

FIG. 9 illustrates a further example of a logic loop for predicting excessive torque increases. In this case the wheel rpm values of the two driven wheels of one axle are input into the loop, but again, it is also possible to use combinations of rpm values of driven and/or non-driven wheels, e.g., an average between the driven and the non/driven wheels. Block 72 represents the step of determining the rpm value of the left-hand driven wheel, while block 74 represents the step of determining the rpm value of the right-hand driven wheel. In step 76, the two rpm values are first filtered, then one rpm value is either subtracted from the other or divided by the other. In step 78, a test is performed as to whether the result of step 76 is below a threshold limit. In the affirmative case (yes), a new measuring cycle is performed. In the negative case (no), a flag is set at step 80, and a new cycle is performed. The flag may trigger, e.g., an increase of the contact pressure in a continuously variable transmission.

Figure 10:
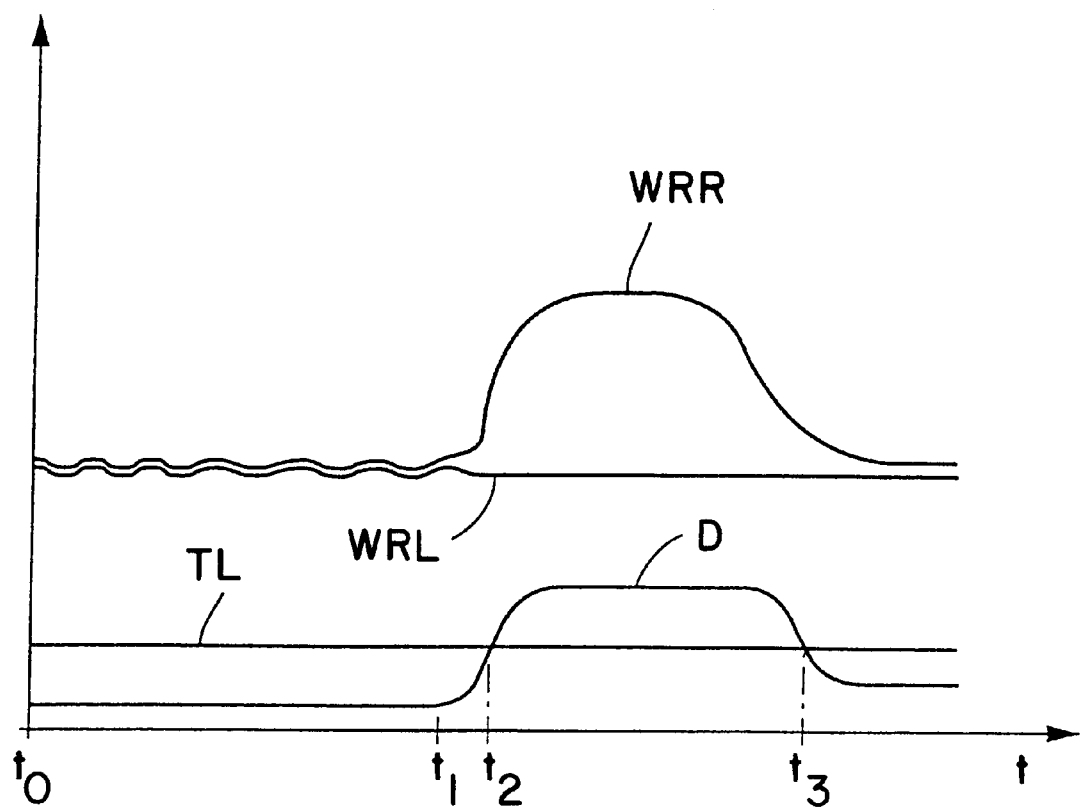
FIG. 10 represents signal curves belonging to the flow diagram of FIG. 9.

FIG. 10 shows a graph of the signal values associated with the logic loop of FIG. 9. WRL and WRR represent the respective rpm values of the left-hand wheel and the right-hand wheel, D represents the difference between the rpm values, and TL is the threshold limit. At the time $t_1$, the difference D begins to increase, crossing the threshold limit TL at the time $t_2$ and thereby causing a flag to be set. At the time $t_3$, the difference D crosses the threshold limit TL in a decreasing sense so that the flag is cancelled. A large difference D between the respective rpm's of the driven and non-driven wheels indicates that a slippage condition exists between at least one wheel and the pavement. If the slippage condition suddenly ceases to exist, there can be peak increases in the amount of torque which, without a commensurate increase in contact pressure, can cause the endless flexible torque-transmitting device to slip.

Other possible concepts for predicting imminent peak increases of the torque employ the same logic programs as are used in essentially known vehicle-stabilizing systems such as anti-lock braking systems, slip-preventing systems, electronic differential-locking systems, etc. By setting lower threshold limits in these kinds of logic programs, it is possible to predict the activation of the respective systems.

By initiating appropriate measures, e.g., increasing the contact pressure of the continuously variable transmission, it is possible to prevent damage caused by acceleration of the drive train.

Figure 11:
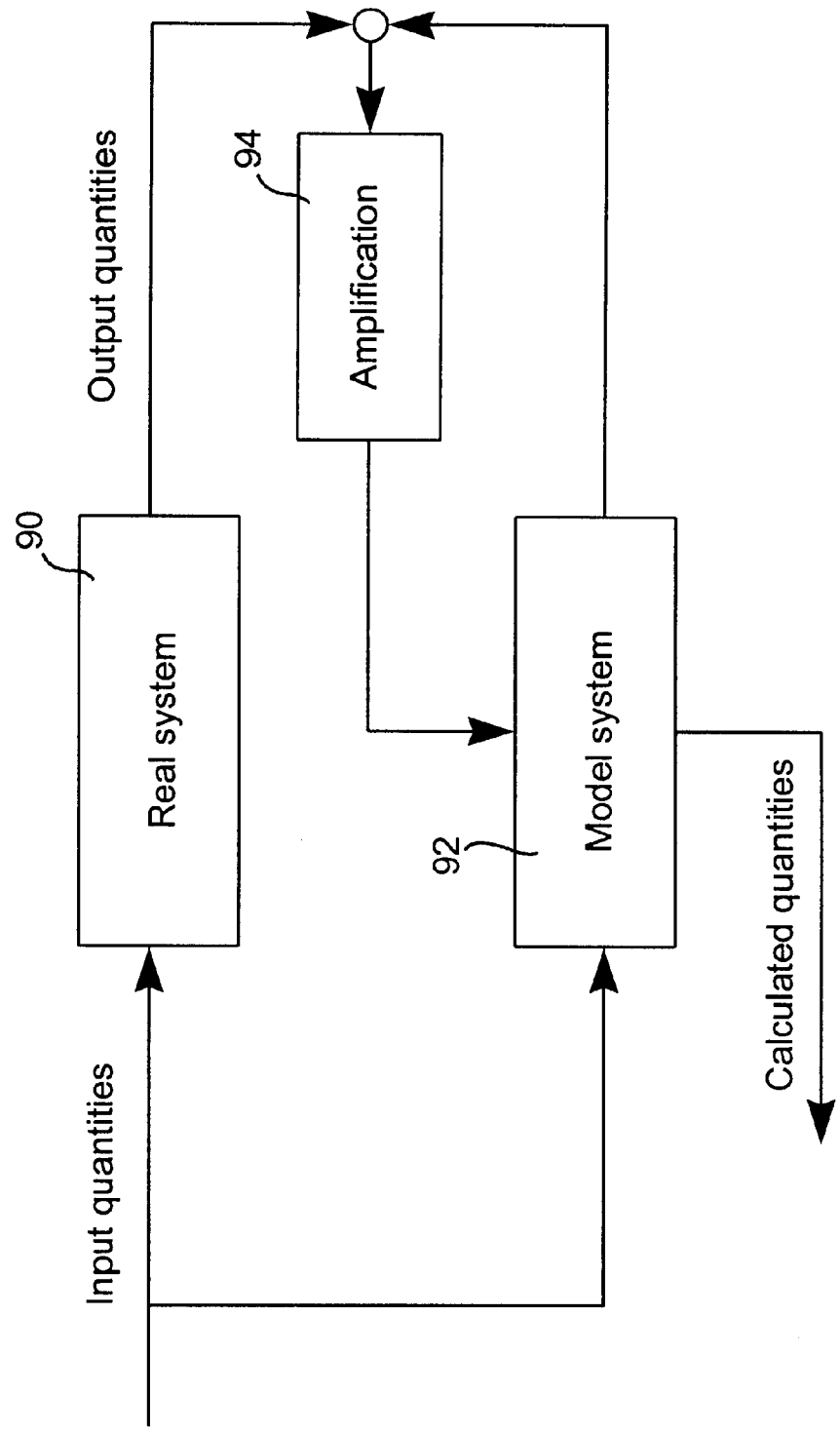
FIG. 11 represents the structure of a monitor for determining the need to adjust the contact pressure.

Another possibility for predicting imminent peak increases of the torque entails the dynamic emulation of real systems through model systems, a concept known from the field of control systems technology. This technique, for which the term "monitor" is used, will be explained on the basis of FIG. 11, as follows:

The real system 90 is the drive train of the vehicle as represented by FIG. 1, comprising, e.g., a continuously variable transmission. The model system 92 is the theoretical emulation of the real system through a system of equations. Input quantities are, e.g., the engine torque and/or the wheel torque(s). Output quantities are measured rpm values and/or measured amounts of torque. Differences between measured and calculated values of the output quantities are amplified in an amplifier unit 94 and introduced into the model system 92. Based on this information, the model system delivers current system-parameter values that cannot be measured directly (e.g., additional rpm, torque, acceleration values). The wheel torque, among others, cannot be measured directly. The wheel torque can be considered an interference factor in the system and can be estimated by means of an interference factor monitor. Thus, introducing a monitor makes it possible to draw conclusions from directly measurable quantities about those quantities that are relevant for making timely and appropriate changes in the contact pressure of the continuously variable transmission.

The logic programs described above are examples for the numerous possibilities of applying the inventive method that is realized mainly in the form of microprocessor software.

Increasing the torque-transmitting capacity of the continuously variable transmission is not necessarily the only kind of measure to be triggered by the setting of a flag. Such measures can also consist of a reduction of the torque-transmitting capacity, i.e., a reduction of the contact pressure. This is the case, e.g., if oscillations are to be attenuated or overloading of system components is to be avoided. The setting of a flag can also be coupled with an increase or reduction of the torque-transmitting capacity of the clutch. Also possible is a combination of the aforementioned measures where the torque-transmitting capacity of the friction-based transmission and the friction-based clutch are controlled to increase and decrease either in a parallel or opposite sense in relation to each other.

Generally, the torque-transmitting capacity is increased and decreased by making a corresponding change in the compressive contact force. One possibility is to raise or lower the compressive contact force by a fixed amount. It is also possible to raise or lower the compressive contact force by a variable amount depending on certain other measured parameters, e.g., the presence of a torque or other condition. It is furthermore possible to build up or decrease the additional contact pressure force through a ramp or in steps. Also feasible is a fixed or variable time lag that can depend on input parameters.

To prevent slippage of the endless flexible torque-transmitting device 44 of the transmission 6 in case of peak increases in the amount of torque, it is advantageous in many practical cases to reduce the contact pressure of the clutch rather than increase the contact pressure of the transmission, so that the peak increase of the torque is taken up by the slipping clutch and is thereby prevented from entering the transmission. Clutch slippage occurring over short time intervals is harmless, because clutches are designed to have components that slip in relation to each other, with the slippage gradually fading out as the clutch is engaged.

The invention makes it possible, through controlled shifts of the continuously variable transmission, to prevent or alleviate jolting or shaking of the vehicle. This is most successful when starting the vehicle with the transmission set at a high ratio, after the clutch has already been engaged, because in this case the drive train frequency is low. A prerequisite to control the jolting or shaking behavior is a sufficient dynamic shifting response of the transmission ratio, i.e., a sufficiently fast response of the valve B of FIG. 3 and the valve D of FIG. 4.

Figure 12:
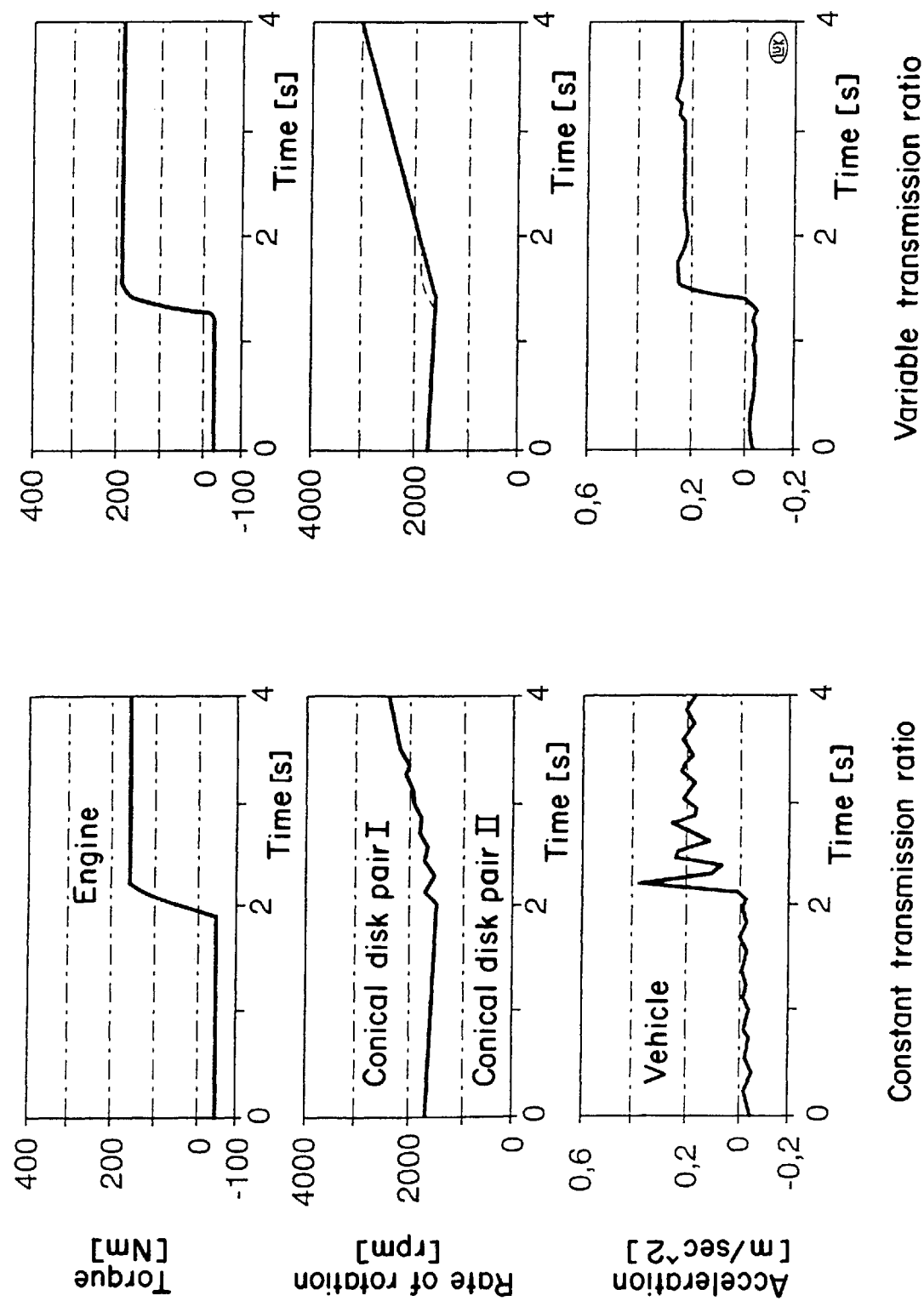
FIG. 12 represents curves serving to illustrate the suppression of drive train oscillations.

FIG. 12 shows an example. The three graphs to the left represent the vehicle behavior with a constant transmission ratio, while the three graphs to the right represent the vehicle behavior with a variable transmission ratio.

The graph at the top on the left side illustrates a step increase in the torque generated by the engine. This step increase of the torque causes elastic oscillations in the rpm's of the first and second pairs of conical disks of the continuously variable transmission. For simplicity's sake, the representation is scaled so that the rpm's of both disk sets appear as being equal. According to the graph at the bottom of the left side, the oscillations cause the vehicle to shake in a manner detrimental to the comfort of the occupants, subsiding more or less rapidly depending on what damping measures are provided in the vehicle.

The graph at the top on the right of FIG. 12 illustrates an identical step increase of the torque generated by the motor. By shifting the ratio of the continuously variable transmission towards a higher input-rpm rate in the presence of a step increase of the torque, the step increase is kept from being transmitted to the output side of the drive train, so that no jolting or shaking occurs. Accordingly, as illustrated in the graphs on the right side of FIG. 12, the rpm rates of the disk sets and the vehicle acceleration are largely free of oscillations.

The measured parameter value for the engine torque of FIG. 12 is, e.g., a signal derived from the position of the throttle valve and/or from the air intake rate or the fuel injection rate. The shift in the transmission ratio that accompanies a change of the engine torque, where in the presence of a torque-load increase the ratio is at first changed towards underdrive, depends on the drive-train frequency, i.e., the transmission ratio and the level of damping. The ratio shift is superimposed on the "quasi-static" (i.e., normal) shift that is performed in accordance with the set of shift characteristics stored in the memory of the control system. The torque-related signal acquired from the engine precedes the actual dynamic changes of the torque, so that the delay in the response of the shift control can be at least partially compensated.

In a further application of the inventive method, the ratio-shifting process of the transmission as an anti-shaking measure is additionally or exclusively regulated. In this case, an input rpm rate (engine rpm or transmission rpm) and/or the output rpm rate of the transmission are required in addition to the engine-torque signal. This arrangement can also be used to alleviate jolting or shaking caused by a torque change at the wheels, e.g., when a previously slipping wheel has resumed its adhesive grip on the pavement.

The invention is also applicable to drive trains containing a gear transmission or other shape-meshing transmission, where a frictional engagement occurs only in a friction clutch.

As part of a method for controlling the operation of a system that transmits torque through a frictional engagement, the respective rpm fluctuations of an input element and an output element are acquired and correlated to each other. When there is a change in the correlation, a shift is performed in the operating state of the system. Another application of the method entails the acquisition of operating parameters of the drive train that indicate that the torque is about to rise to a peak level, whereupon a shift is performed in the operating state of the system.

Following is an example for the calculation of a cross-correlation function, it being understood that other correlation functions can also be used in accordance with the invention.

The digital evaluation of the non-standardized cross-correlation function (CCF) can, for example, be expressed through the following representation:

$$C_{xy}(m*\tau) = \frac{1}{N} * \sum_{k=0}^{N-1} x(k*\tau) * y((k-m)*\tau)$$

In the foregoing equation, the terms x(k*τ) and y(k*τ) represent measured values at the time k*τ (τ being the discrete time interval at which the measured data are acquired).

Besides the non-standardized cross-correlation function, there is also a standardized cross-correlation function $CCF_s$ with a range of values from −1 to +1, represented by the equation $$c(m*\tau) = \frac{c(m*\tau)}{\sqrt{C_{xx}(0) * C_{yy}(0)}}$$

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of controlling an operating state of a system that transmits torque through a frictional engagement in a drive train of a motor vehicle, comprising the steps of
   a) monitoring fluctuations of operating parameters of the drive train, the operating parameters being a first rate of rotation of an input element of said system and a second rate of rotation of an output element of said system;
   b) establishing a correlation between said first rate of rotation and said second rate of rotation; and
   c) initiating a change in said operating state if said correlation is found to have crossed a threshold level.

2. The method of claim 1, wherein a torque-transmitting capacity of the system is increased when said correlation falls below a predetermined value.

3. The method of claim 1, wherein a transmission ratio of a continuously variable transmission is changed when there is a decrease of said correlation.

4. A method of controlling an operating state of a system that transmits torque through a frictional engagement in a drive train of a motor vehicle, comprising the steps of
   a) monitoring fluctuations of operating parameters of the drive train, the operating parameters being of a kind that will indicate when the torque is about to increase to an excessive level; and
   b) initiating a change in said operating state if the torque is about to increase to an excessive level.

5. The method of claim 4 wherein a change of a rate of rotation of at least one driven wheel of the motor vehicle is measured and a change in said operating state is initiated if the change of the rate of rotation exceeds a predetermined value.

6. The method of claim 4, wherein a difference is measured between a first rate of rotation of the at least one driven wheel and a second rate of rotation of a further wheel of the motor vehicle and said operating state is changed if said difference exceeds a predetermined value.

7. The method of claim 4, wherein said operating state is changed upon activation of stabilizing systems for stabilizing a driving behavior of the motor vehicle.

8. The method of claim 4, wherein threshold values of algorithms used to activate stabilizing systems for stabilizing a driving behavior of the motor vehicle are lowered and said operating state is changed when the lowered threshold values are exceeded.

9. The method of claim 4, wherein the system is a friction clutch and wherein further said change in said operating state comprises a change in torque-transmitting capacity of said friction clutch.

10. The method of claim 4, wherein the system is a continuously variable transmission and wherein further said change in said operating state comprises a change in torque-transmitting capacity of said continuously variable transmission.

11. The method of claim 4, wherein the system is a continuously variable transmission and wherein further said change in said operating state comprises a transmission-ratio change of said continuously variable transmission.

12. The method of claim 4, wherein at least one control parameter controlling an output torque delivered by an engine is monitored and, if the control parameter is found to have changed, a ratio-change is initiated in a continuously variable transmission arranged in the drive train.

13. The method of claim 12, wherein the ratio-change is directed towards an underdrive condition if there is an increase in the output torque.

14. Apparatus for controlling an operating state of a system that transmits torque through a frictional engagement in a drive train of a motor vehicle, comprising:
   (a) first means for monitoring fluctuations of operating parameters of the drive train, the operating parameters being a first rate of rotation of an input element of said system and a second rate of rotation of an output element of said system;
   b) second means for establishing a correlation between said first rate of rotation and said second rate of rotation; and
   c) third means for initiating a change in said operating state if said correlation is found to have crossed a threshold level.

* * * * *